United States Patent
Cvetkovic et al.

(10) Patent No.: US 9,734,466 B2
(45) Date of Patent: Aug. 15, 2017

(54) MULTI-TENANCY ENGINE

(75) Inventors: Boban Cvetkovic, Walldorf (DE);
Robert Boban, Walldorf (DE)

(73) Assignee: SAP SE, Walldorf (DE)

( * ) Notice: Subject to any disclaimer, the term of this patent is extended or adjusted under 35 U.S.C. 154(b) by 815 days.

(21) Appl. No.: 12/268,810

(22) Filed: Nov. 11, 2008

(65) Prior Publication Data
US 2010/0121923 A1  May 13, 2010

(51) Int. Cl.
*G06Q 10/06* (2012.01)
*G06F 17/30* (2006.01)
*H04L 12/24* (2006.01)

(52) U.S. Cl.
CPC ............. *G06Q 10/06* (2013.01); *G06F 17/30* (2013.01); *H04L 41/02* (2013.01); *H04L 41/08* (2013.01); *H04L 41/00* (2013.01)

(58) Field of Classification Search
CPC ... G06Q 10/06; G06F 17/30; G06F 17/30286; H04L 41/00; H04L 41/02; H04L 41/022; H04L 41/0226; H04L 41/08; H04L 41/0893
See application file for complete search history.

(56) References Cited

U.S. PATENT DOCUMENTS

| | | | | |
|---|---|---|---|---|
| 5,321,743 A * | 6/1994 | Bogart | ................. | H04Q 3/0029 379/220.01 |
| 5,915,008 A * | 6/1999 | Dulman | ............. | H04L 63/0281 370/352 |
| 6,617,969 B2 * | 9/2003 | Tu et al. | ........................ | 340/517 |
| 6,668,253 B1 * | 12/2003 | Thompson | ............. | G06Q 10/06 |
| 7,080,051 B1 * | 7/2006 | Crawford | .................. | G06F 8/61 379/111 |
| 7,174,379 B2 * | 2/2007 | Agarwal | ................. | G06F 9/505 709/226 |
| 7,174,557 B2 * | 2/2007 | Sanghvi | .................. | G06F 9/542 709/217 |
| 7,260,577 B1 * | 8/2007 | Alavi et al. | | |
| 7,373,349 B2 * | 5/2008 | O'Brien | ............... | G06Q 10/087 707/736 |
| 7,539,291 B2 * | 5/2009 | D'Angelo | ........... | H04L 12/5835 379/100.08 |
| 7,600,249 B1 * | 10/2009 | Blevins | .............. | H04N 7/17318 725/78 |
| 7,634,505 B2 * | 12/2009 | Chasman | .......... | G06F 17/30578 |
| 7,680,848 B2 * | 3/2010 | Janedittakarn | .... | G06F 17/30424 707/613 |
| 7,747,572 B2 * | 6/2010 | Scott | ...................... | G06Q 10/06 707/618 |

(Continued)

*Primary Examiner* — Patrice Winder
*Assistant Examiner* — Angela Widhalm De Rodri
(74) *Attorney, Agent, or Firm* — Brake Hughes Bellermann LLP

(57) ABSTRACT

According to one general aspect, in one embodiment, a method may include establishing a relationship with a plurality of external tenant systems configured to utilize an internal ERP service provider system. In one embodiment, the method may also include receiving an external tenant message from one of the external tenant systems. The method may further include, in various embodiments, converting the received external tenant message to an internal provider message. In some embodiments, the method may include transmitting the converted internal provider message to at least a portion of the internal ERP service provider system.

21 Claims, 7 Drawing Sheets

(56) References Cited

U.S. PATENT DOCUMENTS

| | | | | |
|---|---|---|---|---|
| 7,821,929 B2* | 10/2010 | DelRegno | ............... | H04L 47/10 370/230 |
| 7,885,276 B1* | 2/2011 | Lin | ............... | 370/401 |
| 7,921,299 B1* | 4/2011 | Anantha | ............... | G06F 21/53 705/51 |
| 7,937,711 B2* | 5/2011 | Hass | ............... | G06Q 10/06 709/226 |
| 7,962,644 B1* | 6/2011 | Ezerzer | ............... | H04M 3/5191 370/352 |
| 8,140,576 B1* | 3/2012 | Viripaeff | ............... | G06F 17/30525 707/781 |
| 8,146,099 B2* | 3/2012 | Tkatch | ............... | G06Q 10/06 719/316 |
| 8,316,457 B1* | 11/2012 | Paczkowski | ............... | H04L 67/306 726/27 |
| 8,505,027 B2* | 8/2013 | Warner | ............... | G06F 9/44563 707/705 |
| 8,930,244 B2* | 1/2015 | Ballaro | ............... | G06Q 10/087 705/26.81 |
| 2002/0095498 A1* | 7/2002 | Chanda | ............... | H04L 12/2889 709/225 |
| 2003/0069975 A1* | 4/2003 | Abjanic | ............... | H04L 63/0428 709/227 |
| 2003/0093516 A1* | 5/2003 | Parsons et al. | ............... | 709/224 |
| 2003/0172190 A1* | 9/2003 | Greenblat | ............... | H04L 12/422 709/251 |
| 2003/0200486 A1* | 10/2003 | Marwaha | ............... | H04L 41/0686 714/39 |
| 2003/0204612 A1* | 10/2003 | Warren | ............... | H04L 69/08 709/230 |
| 2006/0085243 A1* | 4/2006 | Cooper | ............... | G06Q 10/06 705/7.42 |
| 2006/0287903 A1* | 12/2006 | Heard | ............... | 705/8 |
| 2007/0197189 A1* | 8/2007 | Horel | ............... | G06Q 20/16 455/406 |
| 2008/0037520 A1* | 2/2008 | Stein | ............... | H04M 7/0069 370/352 |
| 2009/0049056 A1* | 2/2009 | Shutt | ............... | G06F 17/30575 |
| 2009/0119416 A1* | 5/2009 | Sirdevan et al. | ............... | 709/246 |
| 2009/0210427 A1* | 8/2009 | Eidler | ............... | G06F 11/1484 |
| 2010/0049637 A1* | 2/2010 | Laventman | ............... | G06Q 10/06 705/30 |
| 2011/0004622 A1* | 1/2011 | Marson | ............... | G06Q 10/10 707/770 |

* cited by examiner

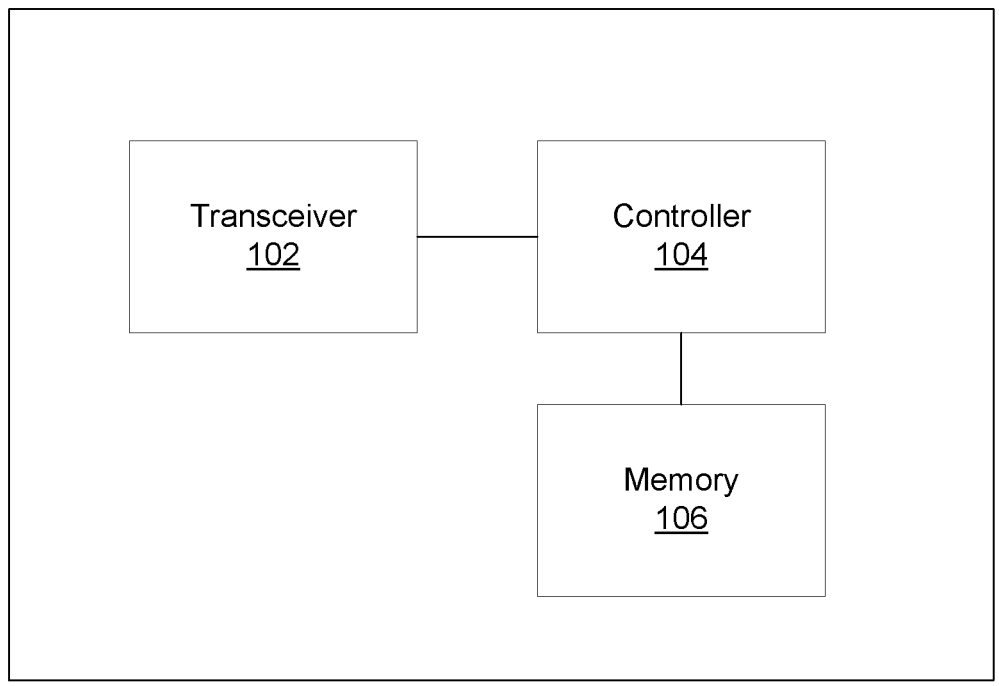

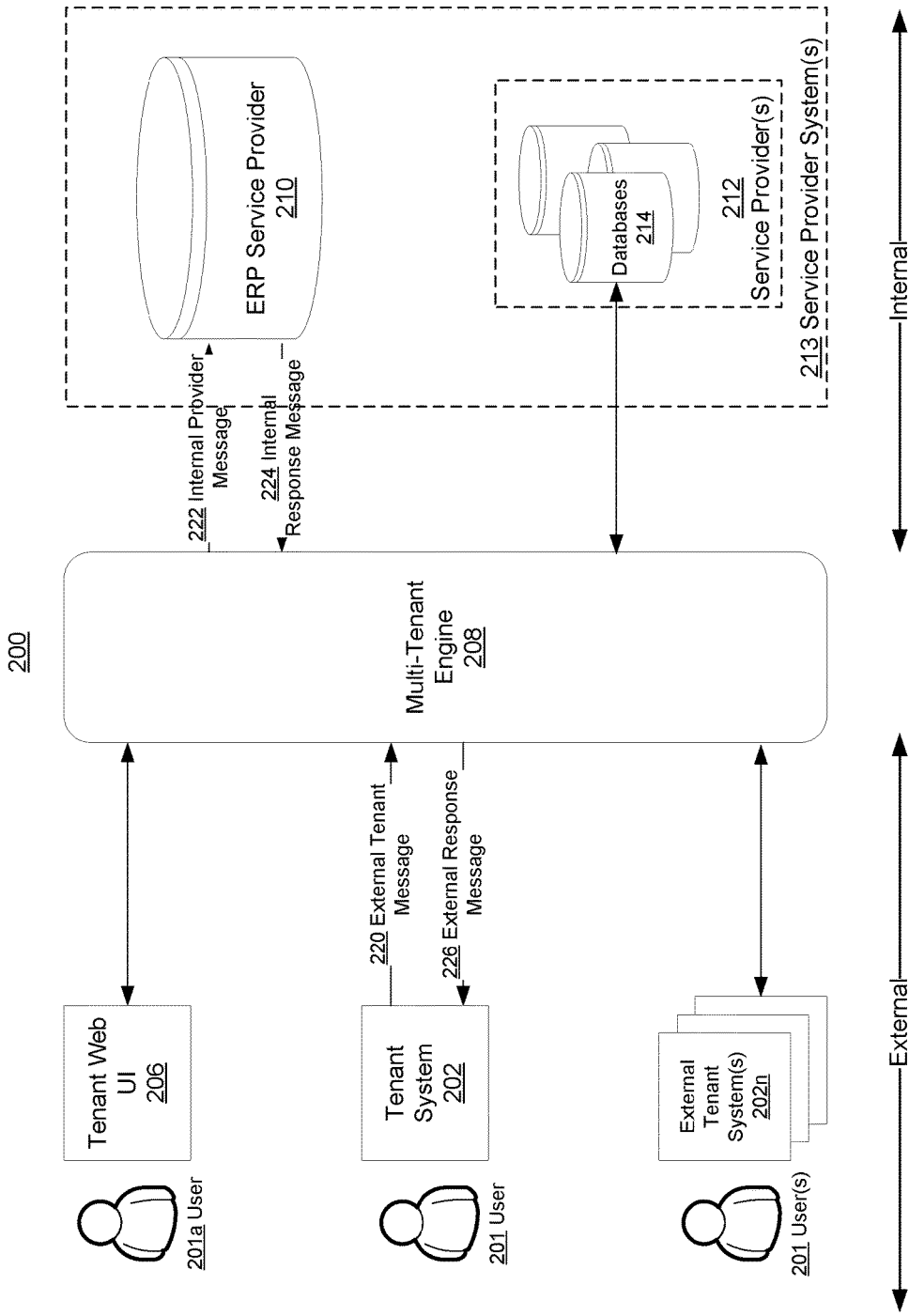

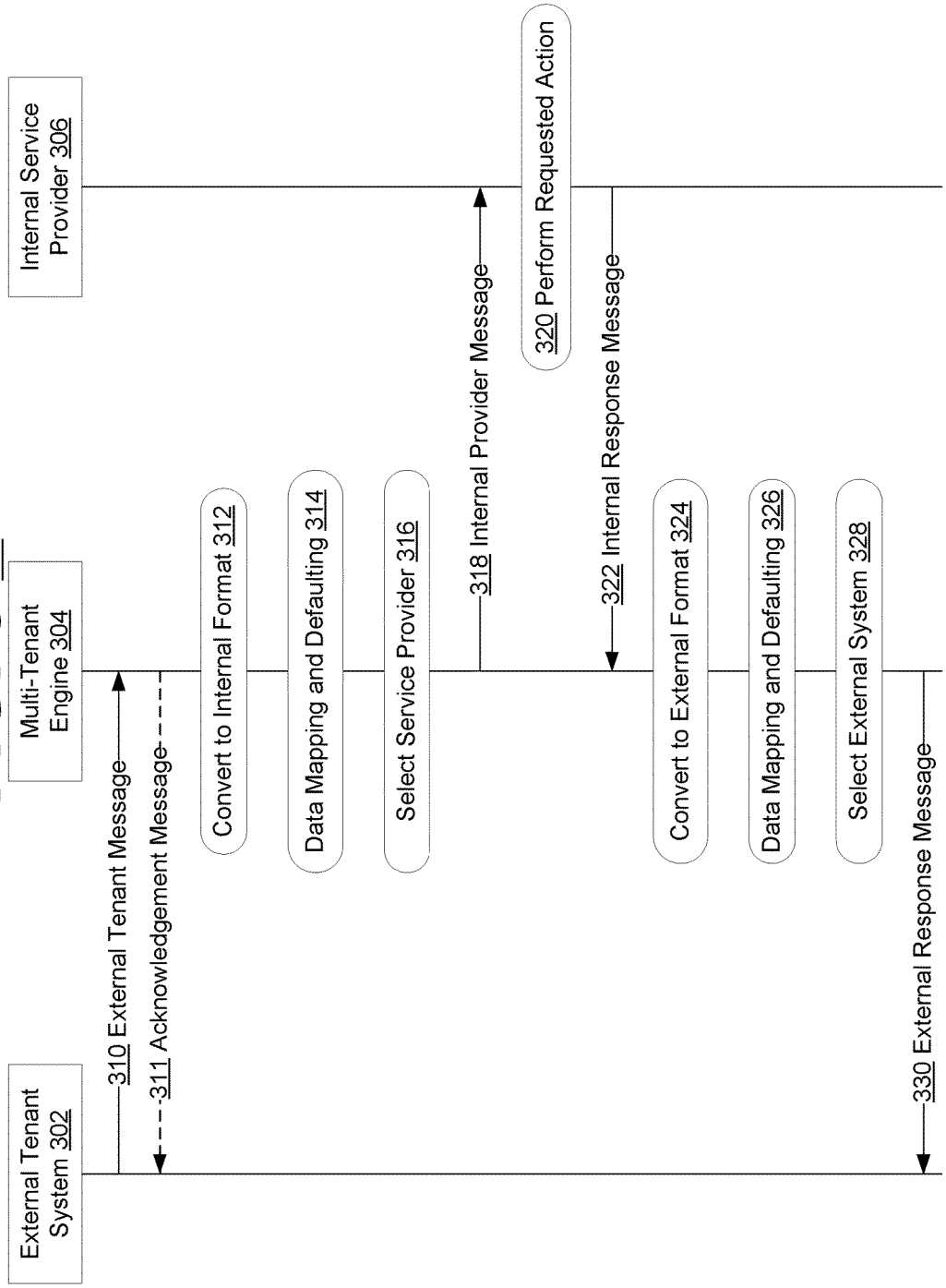

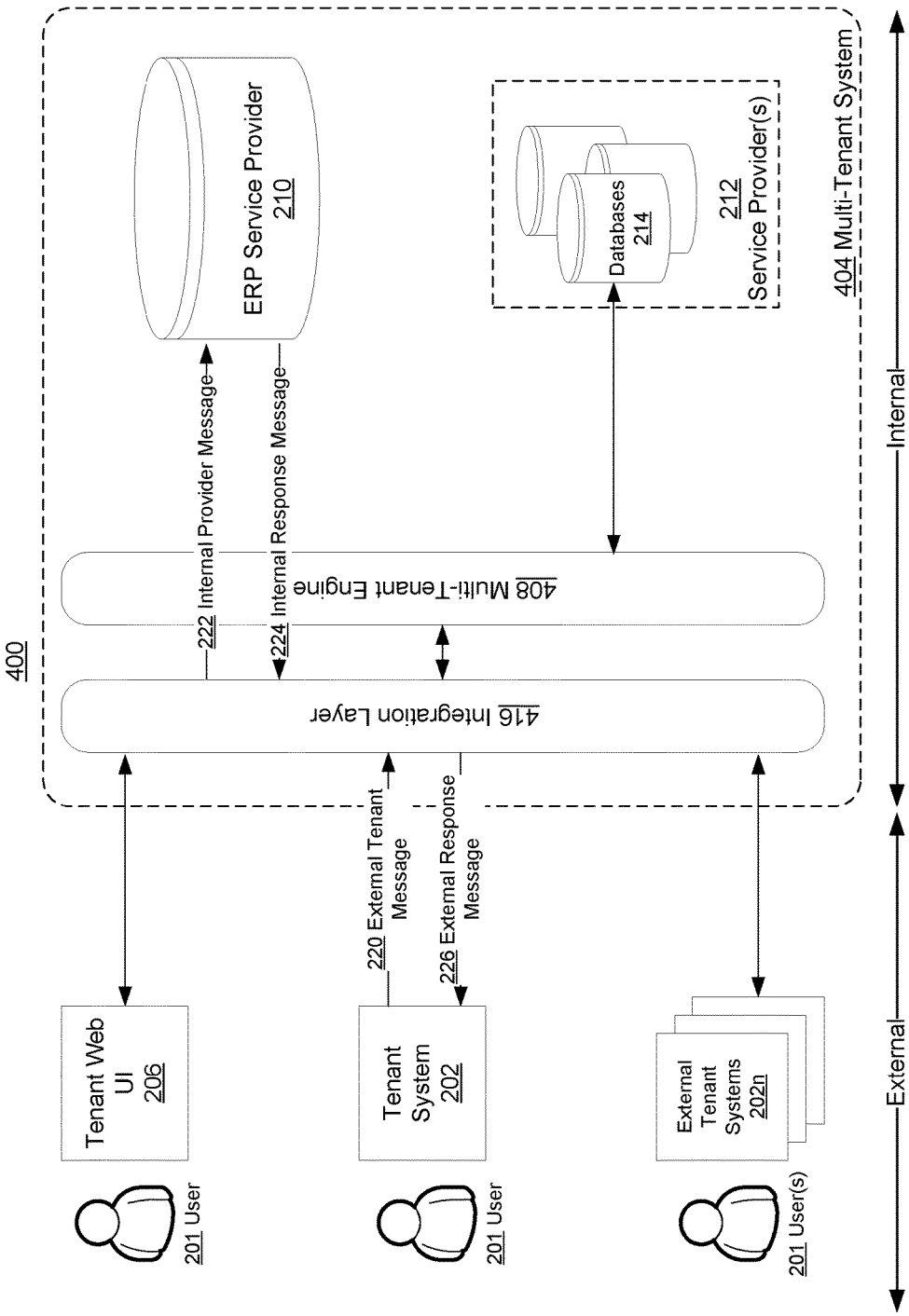

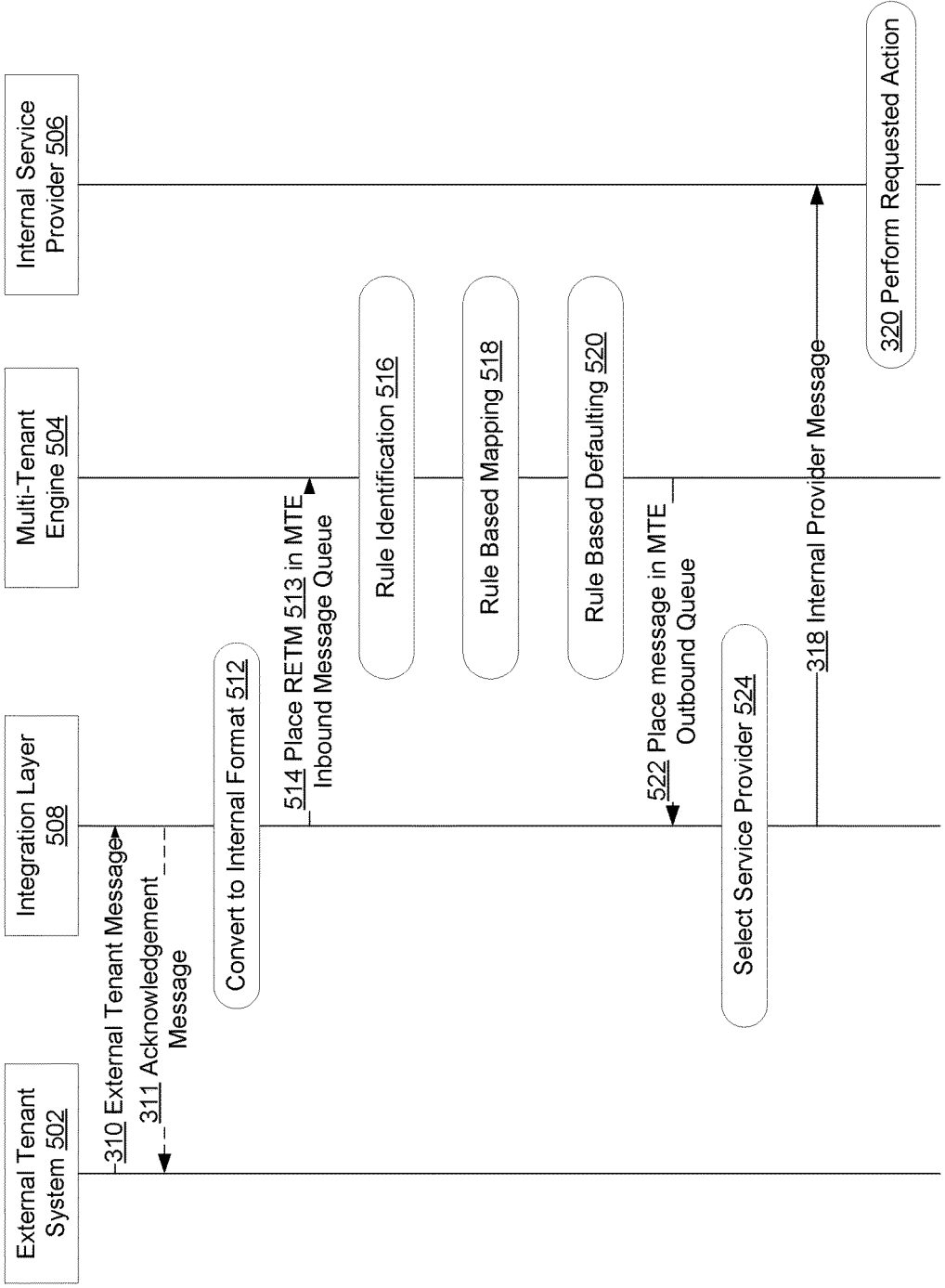

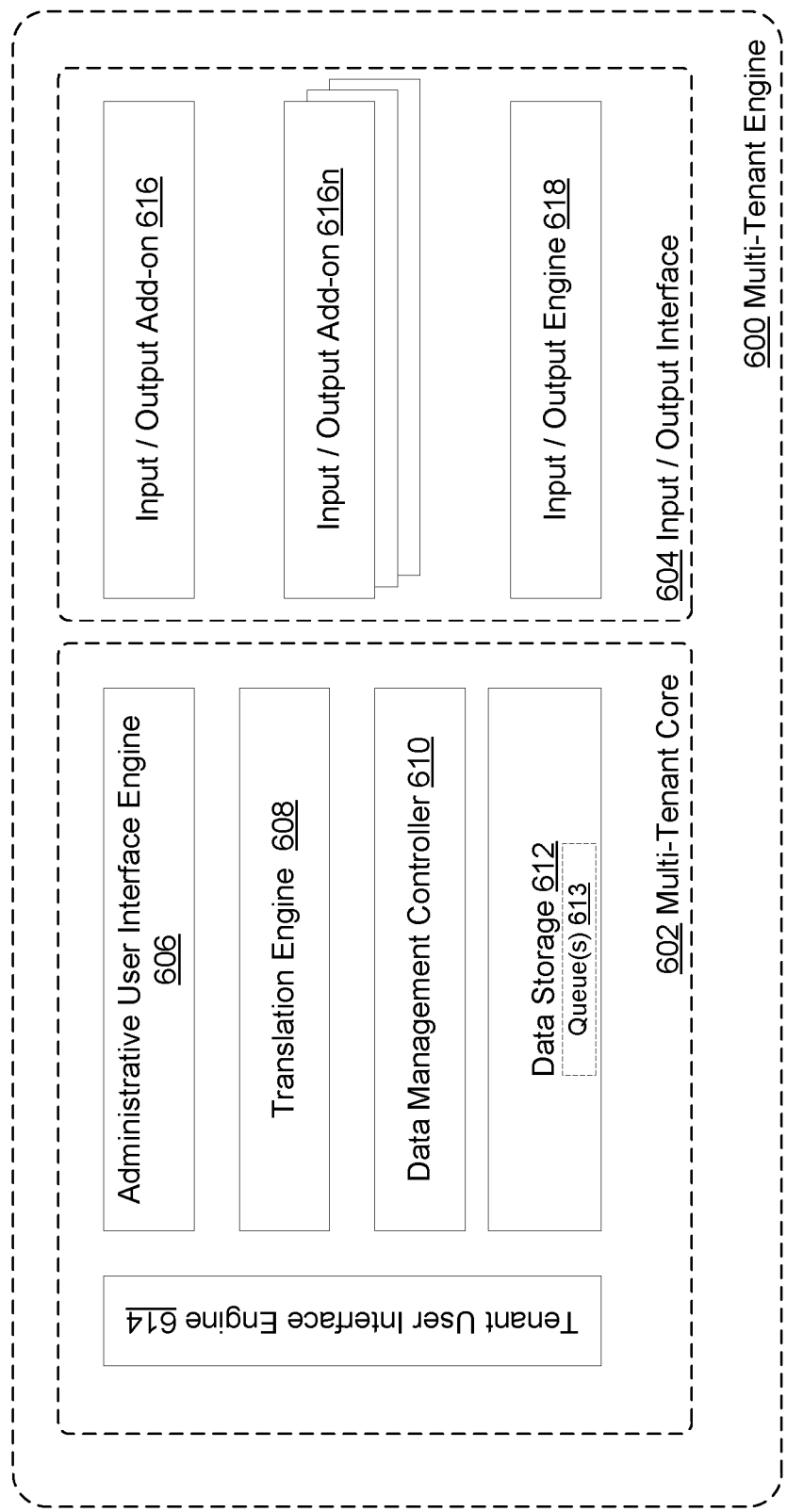

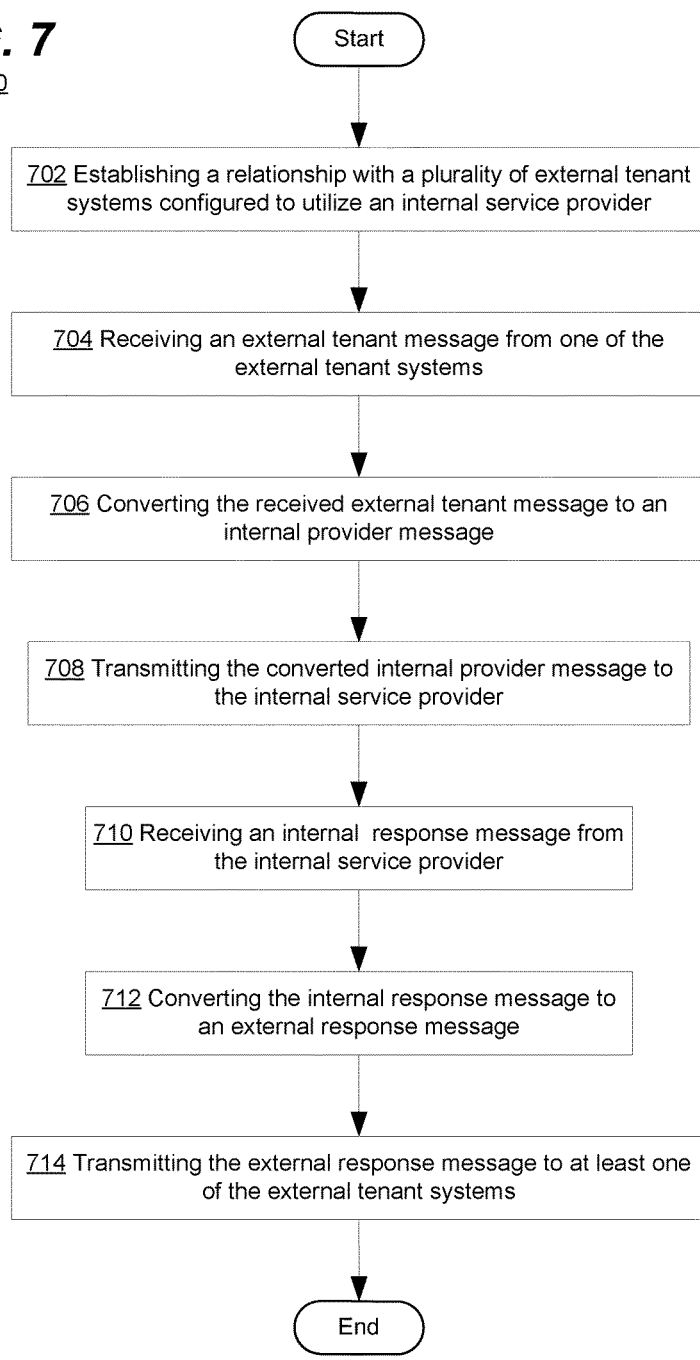

MULTI-TENANCY ENGINE

TECHNICAL FIELD

This description relates to multi-tenancy services and more specifically to multi-tenancy of a customer relationship management service provider.

BACKGROUND

Traditionally, large infrastructure level software applications have been locally installed and executed on a customer's computing machine, either as a stand-alone application or as an internal client-server system. Alternatively, a customer may purchase a mainframe or multi-headed system in which the application is executed by a single centralized machine and multiple users may access the machine via a plurality of individual keyboards and screens (colloquially referred to as "heads").

Software as a service (SAAS) is a model of software deployment where an application is hosted, in whole or part, as a service provided to customers across a network (e.g., the Internet, etc.). By eliminating the need to install and run the entire application on the customer's own computer, SAAS often alleviates the customer's burden of software maintenance, ongoing operation, and support. Conversely, customers often relinquish control over the software. Also, using SAAS can typically reduce the up-front expense of software purchases, through less costly, often on-demand pricing. From the software vendor's standpoint, SAAS has the attraction of providing stronger protection of its intellectual property, establishing an ongoing revenue stream, and attracting customers who might traditionally be priced out of the market. In general, a SAAS software vendor may host the application on its own server, or this function may be handled by a third-party application service provider (ASP).

Enterprise resource planning (ERP) is typically the planning of how business resources (e.g., inventory, employees, customers, etc.) are acquired and flow through the business process associated with each resource. Frequently, ERP includes the capture, storage and analysis of information relating to the tracked resources. In various cases ERP may be divided into sub-categories or systems pertaining to financials, human capital management, materials management, customer relationship management, sales & distribution, and production planning, corporate services, and/or general operations management. In general, a well executed ERP system enhances productivity and provides insight to a business. Often an ERP customer may wish to keep their ERP data secret from their competitors and more generally the world.

Customer relationship management (CRM) is typically the practice of intelligently finding, marketing to, selling to, and servicing customers. Frequently, CRM includes the capture, storage, and analysis of information relating to customers, vendors, partners, and/or internal systems. Often a customer may wish to keep their customer relationship management data secret from their competitors and more generally the world.

SUMMARY

According to one general aspect, in one embodiment, a method may include establishing a relationship with a plurality of external tenant systems configured to utilize an internal ERP service provider system. In one embodiment, the method may also include receiving an external tenant message from one of the external tenant systems. The method may further include, in various embodiments, converting the received external tenant message to an internal provider message. In some embodiments, the method may include transmitting the converted internal provider message to at least a portion of the internal ERP service provider system.

According to another general aspect, an apparatus may include a input/output (I/O) interface, a translation engine, and a data storage. In various embodiments, the I/O interface may be configured to receive an external tenant message from an external tenant system that is configured to utilize an internal ERP service provider. In various embodiments, the I/O interface may also be configured to transmit an internal provider message to an internal ERP service provider. In some embodiments, the translation engine may be configured to convert the received external tenant message to the internal provider message. In yet another embodiment, the data storage may be configured to temporarily store the external tenant message and the internal provider message. In one embodiment, the data storage may be configured to store a set of rules and data values for converting the external tenant message to the internal provider message.

According to another general aspect, a machine readable medium may include instructions capable of being executed by at least one machine, wherein the instructions, when executed, cause the machine to establish a relationship with a plurality of external tenant systems configured to utilize an internal ERP service provider. In various embodiments, the instructions may also cause the machine to receive an external tenant message from one of the external tenant systems. In some embodiments, the instructions may also cause the machine to convert the received external tenant message to an internal provider message. In another embodiment, the instructions may also cause the machine to transmit the converted internal provider message to the internal ERP service provider system.

The details of one or more implementations are set forth in the accompanying drawings and the description below. Other features will be apparent from the description and drawings, and from the claims.

A system and/or method for communicating information, substantially as shown in and/or described in connection with at least one of the figures, as set forth more completely in the claims.

BRIEF DESCRIPTION OF THE DRAWINGS

FIG. 1 is a block diagram of an example embodiment of a system in accordance with the disclosed subject matter.

FIG. 2 is a block diagram of an example embodiment of a system in accordance with the disclosed subject matter.

FIG. 3 is a timing diagram of an example embodiment of a system in accordance with the disclosed subject matter.

FIG. 4 is a block diagram of an example embodiment of a system in accordance with the disclosed subject matter.

FIG. 5 is a timing diagram of an example embodiment of a system in accordance with the disclosed subject matter.

FIG. 6 is a block diagram of an example embodiment of an apparatus in accordance with the disclosed subject matter.

FIG. 7 is a flow chart of an example embodiment of a technique in accordance with the disclosed subject matter.

DETAILED DESCRIPTION

In various embodiments, multi-tenancy may be an architectural principle, wherein a single instance of a software program runs or executes on a software-as-a-service (SAAS) vendor's servers, serving multiple client organizations or tenants. In one embodiment of the multi tenant architectural concept, a software application may be designed to virtually partition its data and/or configuration so that each tenant works with a customized virtual application instance. Each tenant has a virtual "view" of the data and/or processes related to that tenant. Multi-tenant architecture is designed, in various embodiments, to allow tenant-specific configurations of the user interface (UI) (e.g., branding, etc.), business processes and data models. In some embodiments, such customization and partitioning may be enabled without changing the service software. In such an embodiment, the same service software may be shared by all tenants; therefore, transforming system customization into system configuration.

Referring to the Figures in which like numerals indicate like elements, FIG. 1 is a block diagram of a device 100 in accordance with an example embodiment of the disclosed subject matter. In one embodiment, the device 100 may include a multi-tenant engine such as illustrated in FIG. 2. In one embodiment, the device 100 may include a transceiver 102, a controller 104, and a memory 106. In various embodiments, the controller 104 may include a processor. In various embodiments, the transceiver 102 may be configured to communicate via at least one networking standard (e.g., WiFi, WiMAX, Ethernet, etc.). In various embodiments, the memory 106 may include permanent (e.g., compact disc, etc.), semi-permanent (e.g., a hard drive, etc.), or temporary (e.g., volatile random access memory, etc.) memory. For example, some operations illustrated and/or described herein, may be performed by a controller 104, under control of software, firmware, or a combination thereof. In another example, some components illustrated and/or described herein, may be stored in memory 106.

FIG. 2 is a block diagram of an example embodiment of a system 200 in accordance with the disclosed subject matter. In one embodiment, the system 200 may include a plurality of external tenant systems 202 and 202n, a multi-tenant engine 208 and a plurality of service providers 210 and 212. In various embodiments, all or a portion of the plurality of service providers 210 and 212 may be included as a service provider system 213. In some embodiments, the ERP service provider 210 may include one or more ERP services or categories (e.g., financials, human capital management, materials management, customer relationship management, sales & distribution, and production planning, corporate services, general operations management, etc.).

In various embodiments, a number of users 201 or clients may access a service provided by the service providers 210 and 212. In one embodiment, these numbers of users 201 or clients may include competitors or various unrelated businesses. In such an embodiment, it may be important for each user 201 or tenant to be unaware of the other tenants, as far as the provided service is concerned. For example, it may be inappropriate or undesirable for a first tenant to be able to either inadvertently or intentionally examine data created or pertaining to a second tenant and vice versa. In various embodiments, the system 200 may be configured to prevent such access.

In one embodiment, a tenant may include a tenant system 202 which is accessed by a user 201. In such an embodiment, the tenant system 202 may include a traditional computing system or a non-traditional processing system. In various embodiments, the tenant system 202 may include a client-based application that provides a user interface (UI) and some limited functionality. For example, in one embodiment, the tenant system 202 may be configured to operate in both an on-line and off-line mode. In various embodiments, during the off-line mode the tenant system 202 may operate using a locally cached version of data provided by the service provider 210 or 212, and may store messages (e.g., external tenant message 220) to be transmitted when the tenant system 202 has reverted to an on-line mode.

In another embodiment, a tenant may include a tenant web user interface (UI) 206. In such an embodiment, the tenant may access the service or data provided by the service provider 210 or 212 from a web browser or other system agnostic application. For example, a tenant could access the service provider 212 from a mobile device (e.g., a smart phone, etc.) or a more traditional computing device, etc. In such an embodiment, the tenant web user interface (UI) 206 may transmit and receive messages, such as the external tenant message 220 and the external response message 226, as described below. It is understood that the above tenant configurations are merely a few illustrative examples to which the disclosed subject matter is not limited.

In this context, the terms "external" and "internal" are used as experienced from the multi-tenant engine's 206 point of view. In such an embodiment, the term "external" may refer to any system not under the control of the service provider vendor(s) or a system or interface that is controlled by a tenant. In such an embodiment, an external system (e.g., external tenant systems 202n, etc.) may experience data hiding, translation or partitioning such that each tenant receives data in a format that is understood by the tenant and to which the particular tenant is privy. In this context, the term "internal" may be used to refer to any system or application that is under the control of the service provider vendor(s) or a system or interface that is controlled by a service provider vendor(s). In such an embodiment, an internal system may co-locate or co-mingle data from a plurality of tenants. In various embodiments, "internal" and "external" may not be separated by any particular physical barrier and may not refer to any co-location.

In various embodiments, a tenant system 202 may transmit an external tenant message 220 to a service provider 212 or 210. For example, a user 201 may input or edit, via the tenant system 202, various ERP information related to the user's business. The user 201 may then wish to store this information within a database 214 provided by a service provider 212. Other examples may include queries of a database, report requests, data entry, etc.; although, it is understood that the above are merely a few illustrative examples to which the disclosed subject matter is not limited.

In one embodiment, this external tenant message 220 may be intercepted or received by the multi-tenant engine 208. In various embodiments, the multi-tenant engine 208 may provide a centralized interface between the various tenant systems 202 and the various service providers 212 and 210.

In various embodiments, the external tenant message 220 may include data (e.g., customer numbers, record codes, etc.) that are meaningful to the tenant system 202, but not relevant or unique to the service provider 212. For example, two tenants (e.g., a baker and a tour operator) may each have clients who have been given the reference number "client #1". However, since the service provider 212 may co-mingle data from the two tenants, the service provider may not be able to use the reference number "client #1" to store the data from the two tenants. Instead, in one embodiment, the service provider may assign an internal reference number (e.g., "client #67552906") to the first tenant's "client #1" and another internal reference number (e.g., "client

76512640") to the second tenant's "client #1". In such an embodiment, the multi-tenant engine 208 may convert the tenant-centric information to service provider-centric information, and vice versa. In such an embodiment, the tenant may be blissfully unaware of how the tenant's data is represented internally to the service provider side of the system 200.

In various embodiments, the external tenant message 220 may include a format that is also tenant-centric. For example, in one embodiment, the tenant system 202 may transmit messages using a remote procedure call (RPC) format. Conversely, the tenant web UI 206 may transmit messages using an extensible markup language (XML) format. In such an embodiment, the service provider 212 or 210 may make use of message using a third formatting. In such an embodiment, the multi-tenant engine 208 may convert the tenant-centric formatting to service provider-centric formatting, and vice versa.

It is understood that the above are merely a few illustrative examples to which the disclosed subject matter is not limited. In various embodiments, other translation and conversion tasks, desires and reasoning may be employed.

As described above, in various embodiments, the multi-tenant engine 206 may be configured to convert the received external tenant message 220 to an internal provider message 222. Also, the multi-tenant engine 206 may be configured to convert an internal response message 224 to an external response message 226. In general embodiments, the multi-tenant engine 206 may be configured to convert messages crossing the conceptual external/internal barrier. Details of various embodiments of the conversion process are described in more detail below, specifically in regard to FIGS. 3 and 5.

In various embodiments, the multi-tenant engine 206 may be configured to convert the external tenant message 220 to an internal provider message 222. The multi-tenant engine 206 may also be configured to transmit this internal provider message 222 to the appropriate service provider 212 or 210. In various embodiments, the appropriate service provider may be identified in or derivable from the external tenant message 220. The multi-tenant engine 206 may also be configured to select the appropriate service provider or providers.

In various embodiments, one or more service providers 212 or 210 may be included in the system 200. In various embodiments, these service providers may be configured to store data from the tenant systems 202. In various embodiments, these service providers 212 may include one or more databases 214. In one specific embodiment, a service provider may include an ERP service provider 210 and be configured to store or process ERP related data.

In various embodiments, the service provider 210 or 212 may receive the converted internal provider message 222. In such an embodiment, the service provider 210 or 212 may process the message 222 (e.g., store data, perform a query, etc.). In such an embodiment, the service provider 210 or 212 may respond to the internal provider message 222 with an internal response message 224. In various embodiments, the internal response message 224 may include, for example, an error message, an acknowledgement that data was correctly stored, the results of a query, etc.; although, it is understood that the above are merely a few illustrative examples to which the disclosed subject matter is not limited.

It is understood that the process experienced by and resulting from the internal response message 224 may be representative of any message originating from a service provider 210 or 212 or any other internal system and being transmitted to a tenant system 202 or other external system. As such, the internally originating message (e.g., internal response message 224) may not be in response to a specific external tenant message 220 and may occur spontaneously.

In various embodiments, the multi-tenant engine 208 may convert the internally originating message (e.g., internal response message 224) to an external message (e.g., external response message 226) in a similar fashion to that described above in reference to the external-to-internal conversion of the external tenant message 220 to the internal provider message 222 described above.

In various embodiments, the multi-tenant engine 208 may be configured to convert external messages to internal messages, and vice versa. In various embodiments, the multi-tenant engine 208 may be configured to control access to the data stored by the service providers 212 and 210 based upon the accessing tenant system 202, such that no tenant may access another tenant's information. In such an embodiment, the multi-tenant engine 208 may be configured to provide a customized interface for each tenant system 202. It is understood that the above are merely a few illustrative examples to which the disclosed subject matter is not limited. Some of these examples may be explained in more detail below.

FIG. 3 is a timing diagram of an example embodiment of a system 300 in accordance with the disclosed subject matter. In one embodiment, the system 300 may include an external tenant system 302, a multi-tenant engine 304 and at least one internal service provider 306. In various embodiments, the timing diagram illustrated may be performed by the systems of FIG. 2 or 4.

In one embodiment, the external tenant system 302 may be configured to transmit an external tenant message 310, as described above. In various embodiments, this external tenant message 310 may use a protocol convenient for the tenant system 302 and may include tenant-centric data or formatting, as described above. In one embodiment, this may be received by the multi-tenant engine 304, as described above.

In one embodiment, the multi-tenant engine 304 may respond with an acknowledgement message 311. In various embodiments, this acknowledgement message 311 may be far less informative than a full response message (e.g., external response message 330, etc.) In various embodiments, the acknowledgement message 311 may merely include an acknowledgement that the external tenant message 310 has been received by the multi-tenant engine 304. In various embodiments, the external tenant system 302 may continue normal operation once the acknowledgement message 311 has been received. This may be convenient as, in some embodiments, the conversion and processing of the message by the multi-tenant engine 304 and the service provider 306 may take some time (e.g., if a large number of tenant operations are occurring, one of the components of the system 300 is experiencing a large workload, etc.). In such an embodiment, the external tenant message 310 may be treated as a non-blocking message from the tenant's point of view, in that the acknowledgement message 311 may prevent the tenant system 302 from waiting to receive a fuller response. In various embodiments, the generation of an acknowledge message 311 may depend upon various factors (e.g., the configuration go the multi-tenant engine 304, the transmitting tenant system 302, the type of command included in the external tenant message 310, etc.)

Block 312 illustrates that, in one embodiment, the multi-tenant engine 304 may convert the external tenant message 310 to an internal messaging format. In various embodiments, the conversion may include reformatting the message from a first external format to a second internal format. For example, in one embodiment, reformatting may include converting a hyper text markup language (HTML) message to a Simple Object Access Protocol (SOAP) formatted message; although, it is understood that the above is merely a one illustrative example to which the disclosed subject matter is not limited.

Block 314 illustrates that, in one embodiment, the multi-tenant engine 304 may be configured to map external data values to internal data values. For example, as described above, the external tenant message 310 may include a "client number" field with a value of "1". In such an embodiment, for example, the multi-tenant engine 304 may identify that the transmitting tenant system 212 is "Joe's Garage" and map the "client number" value to "456000001"; although, it is understood that the above is merely a one illustrative example to which the disclosed subject matter is not limited.

In various embodiments, the multi-tenant engine 304 may be configured to convert or more specifically to map data using a rule based conversion system. In such an embodiment, the multi-tenant engine 304 may follow a rule stating that all client numbers from "Joe's Garage" are six digits long and are prefixed with an internal customer number of "456". Other data, subject to data mapping, may include object formats, object identifiers, customer information, metadata, etc.; although, it is understood that the above are merely a few illustrative examples to which the disclosed subject matter is not limited. In other embodiments, the multi-tenant engine 304 may be configured to use a more straight-forward mapping scheme, another scheme, or a combination of schemes depending on what data field or portion is being mapped.

Block 314 also illustrates that, in one embodiment, the multi-tenant engine 304 may be configured to provide default data values when expected or desired data has not been provided by the external tenant message 310. For example, an external tenant message 310 may not include information about the relationship between the tenant and service provider (e.g., tenant number, passwords, billing information, etc.) In such an embodiment, the multi-tenant system 304 may be configured to provide expected or desired data when converting the external tenant message 310 to an internal provider message 318. In other embodiments, data defaulting may occur not just when the external tenant message 310 does not contain enough information to create a valid internal provider message 318, but, in various embodiments, for instances where a particular data is the norm and defaulting may reduce transmission or message 310 size. In various embodiments, the multi-tenant engine 304 may select the default data based upon the transmitting tenant system 302, a rule based system, or other scheme or schemes, as described above. In various embodiments, the multi-tenant engine 304 may use a set of master defaulting data for a particular tenant that has been pre-loaded and associated with a particular tenant system 302 prior to the transmission of the external tenant message 310.

Block 316 illustrates that, in one embodiment, the multi-tenant engine 304 may select a service provider 306 to receive the converted internal provider message 318. In various embodiments, the selection may be based upon which tenant system 302 transmitted the external tenant message 310, the work load of the respective service providers, the capabilities of the service providers, etc.; although, it is understood that the above are merely a few illustrative examples to which the disclosed subject matter is not limited. In various embodiments, this selection may include selecting a specific queue associated with the characteristics (e.g., capabilities, type, etc.) of a selectable service provider.

Upon selection of the appropriate service provider 306, the multi-tenant engine 304 may transmit the converted internal provider message 318. In various embodiments, this transmittal may include posting the internal provider message 318 to a specific queue associated with the selected service provider 306. In such an embodiment, the service provider 306 may retrieve the internal provider message 318 at its convenience. In such an embodiment, instead of "pushing" a message to the service provider 306, the message may be "published" to a queue to which the service provider 306 "subscribes". In some embodiments, the internal provider message 318 may be transmitted from the queue to all "subscribers" (e.g., the service provider 306) or, alternately, in one embodiment, the "subscribers" may "pull" the message from the queue.

Block 320 illustrates that, in one embodiment, once the service provider 306 has acquired the internal provider message 318, the message 318 may be processed by the service provider 306. As described above, in various embodiments, this may include various actions, such as, storing data, retrieving data, executing a query, etc.; although, it is understood that the above are merely a few illustrative examples to which the disclosed subject matter is not limited. In various embodiments, the service provider 306 may respond to the internal provider message 318 as if it originated from a client system internal to the service provider's landscape and not from an external tenant system 302. In such an embodiment, the internal provider message 318 may be functionally indistinguishable from an internally generated provider message (not shown).

In various embodiments, the service provider 306 may respond to the internal provider message 318 by generating an internal response message 322. As described above, any internally generated message destined for a tenant system 302 may be analogous to the internal response message 322 and is within the scope of the disclosed subject matter. In various embodiments, the internal response message 322 may include various information (e.g., a query result, a successful data storage acknowledgement, etc.).

In various embodiments, this internal response message 322 may be received by the multi-tenant engine 304. Block 324 illustrates that, in one embodiment, the internal response message 322, and internally generated messages in general, may be converted to an external format. In various embodiments, this may involve a procedure analogous described above in reference to Block 312. Block 326 illustrates that, in one embodiment, data mapping and defaulting may occur. In some embodiments, this may involve a procedure analogous described above in reference to Block 314.

Block 328 illustrates that, in one embodiment, an external tenant system 302 may be selected to receive the message. In various embodiments, the internal response message 322 may include a tenant number or identifier associated with an external tenant system 302; although, it is understood that the above are merely a few illustrative examples to which the disclosed subject matter is not limited. In some embodiments, this may involve a procedure analogous described above in reference to Block 316.

In various embodiments, the multi-tenant engine 304 may convert the internal response message 322 or other internally generated message to an external response message 330 or similar external message. This external response message 330 may, in one embodiment, be transmitted to the selected external tenant system 302. In another embodiment, the external response message 330 may be enqueued within a queue. In such an embodiment, the external tenant system 302 may access the queue using a publish/subscribe model, as described above.

FIG. 4 is a block diagram of an example embodiment of a system 400 in accordance with the disclosed subject matter. In various embodiments, the system 400 may include a plurality of tenant systems 202, 202n, and 206, a integration engine 416, a multi-tenant engine 406, and at least one service provider 212 and 210. In various embodiments, the system 400 may also include a multi-tenant system 404. In some embodiments, the multi-tenant system 400 may include the integration engine 416, the multi-tenant engine 406, and at least one service provider 212 and 210. In such an embodiment, the multi-tenant system 404 may be co-located or under the control of a single entity, as opposed to the embodiment of systems 400 or 200 in which the service providers 212 and 210 may or may not include service providers under the control of third-parties.

In one embodiment, the integration engine 416 may be configured to integrate a plurality of apparatuses or systems to complete a given workflow. In one embodiment, the integration engine 416 may be configured to relay and route messages between various devices (e.g., service providers, client systems, etc.). In various embodiments, the integration engine 416 may be configured to convert the formatting of messages from a first format to a second format, as described above in relation to the multi-client engine 206 of FIG. 2 and multi-client engine 304 of FIG. 3.

In one embodiment, the multi-tenant engine 406 may be configured to perform mapping and/or data defaulting operations. In such an embodiment, the functions or operations performed by the multi-client engine 206 of FIG. 2 and multi-client engine 304 of FIG. 3 may be split between the integration engine 416 and the multi-tenant engine 406.

In such an embodiment, the integration engine 416 may be configured to reformat the external tenant message 220 to an internal format. In various embodiments, the integration engine 416 may transfer the reformatted version of the external tenant message 220 to the multi-tenant engine 406. In such an embodiment, the multi-tenant engine 406 may be configured to perform data mapping and defaulting, as described above. In some embodiments, this may substantially convert the external tenant message 220 to the internal provider message 222. In various embodiments, the multi-tenant engine 406 may be configured to transfer the internal provider message 222 to the integration engine 416 for transfer to the service provider 212. It is understood that a similar process may occur when converting internally generated messages (e.g., internal response message 224) to corresponding external messages (e.g., external response message 226).

FIG. 5 is a timing diagram of an example embodiment of a system 500 in accordance with the disclosed subject matter. In various embodiments, the system 500 may include an external tenant system 502, an integration layer 508, a multi-tenant engine 504, and an internal service provider 506. In various embodiments, the timing diagram illustrated may be performed by the system of FIG. 4.

In one embodiment, the external tenant system 502 may be configured to transmit an external tenant message 310, as described above. In various embodiments, the integration layer 508 may receive this external tenant message 310. In some embodiments, the integration layer 508 may also return to the external tenant system 502 an acknowledgement message 311, as described above.

In various embodiments, the integration layer or engine 508 may be configured to convert the external tenant message 310 to an internal format, as described above and illustrated by Block 512. In various embodiments, this converted external tenant message 310 may be referred to as a reformatted external tenant message (RETM) 513 (illustrated as part of the action 514).

In various embodiments, this reformatted external tenant message 513 may be may be placed within an inbound message queue. In various embodiments, this inbound message queue may be part of the multi-tenant engine (MTE) 504. In some embodiments, these inbound message queue may use a publish/subscribe paradigm in which the multi-tenant engine 504 is the subscriber and the integration layer 508 is the publisher; although, it is understood that the above is merely one illustrative example to which the disclosed subject matter is not limited.

Block 516 illustrates that, in one embodiment, the multi-tenant engine 504 may be configured to identify and select which of a plurality of rules is suited for the reformatted external tenant message 513. Block 518 illustrates that, in one embodiment, the multi-tenant engine 504 may be configured to perform data mapping using the selected rule, as described above. Block 520 illustrates that, in one embodiment, the multi-tenant engine 504 may be configured to perform data defaulting using the selected rule or rule set, as described above. In some embodiments, the Blocks 516, 518, and 520 may illustrate one embodiment of Block 314 of FIG. 3, as described above.

In various embodiments, the resulting message (e.g., substantially the internal provider message 318) may be placed in an outbound queue of the multi-tenant engine 504. In various embodiments, this queue may operate analogously to the inbound queue described above, but with the integration layer 508 acting as a subscriber.

Block 524 illustrates that, in one embodiment, the integration layer 508 may select an internal service provider(s) 506 to receive the internal provider message 318, as described above. In various embodiments, the message received by the integration layer 508 from the multi-tenant engine 504 may not completely be the internal provider message 318. In such an embodiment, the integration layer 508 may perform further reformatting or processing to convert the message received from the multi-tenant engine 504 to the internal provider message 318.

Block 320 illustrates that, in one embodiment, the internal service provider 506 may process the received the internal provider message 318, as described above. In various embodiments, an analogous conversion process for internally generated messages (e.g., an internal response message) may occur to covert such a message into an equivalent externally message (e.g., an external response message).

FIG. 6 is a block diagram of an example embodiment of an apparatus 600 in accordance with the disclosed subject matter. In one embodiment, the apparatus 600 may include a multi-tenant engine. In various embodiments, the apparatus 600 may include an input/output (I/O) interface 604, a translation engine 608, and a data storage 612. In other embodiments, the apparatus 600 may also include one of more of the following: an administrative user interface (UI) engine 606, a tenant UI engine 614, and/or a data management controller 610.

In various embodiments, the I/O interface 604 may be configured to receive an external tenant message from an external tenant system that is configured to utilize an internal service provider (e.g., an ERP service provider), as described above. In some embodiments, the I/O interface 604 may be configured to transmit an internal provider message to a portion of the internal service provider, as described above. In some embodiments, these actions may be performed by an integrated I/O engine 618 which is included as an integral part of the I/O interface 604.

In some embodiments, however, the I/O interface 604 may be configured to dynamically incorporate at least one I/O interface add-on 616 into the I/O interface 604. In such an embodiment, the I/O interface 604 may include at least one I/O interface add-on 616 and 616n. In various embodiments, each I/O interface add-on 616 may define a communication channel with which to communicate with an external tenant system.

In various embodiments, the external tenant systems and/or the service providers may use a number of formats and protocols to communicate. Some of these protocols may not developed or popular when the multi-tenant engine 600 was created. In such an embodiment, by allowing I/O interface add-ons 616 to be dynamically incorporated into the I/O interface 604, the I/O interface 604 may be capable of increasing or adjusting the types of communication protocols and formats that are usable. In such an embodiment, instead of a tenant system having to be reconfigured to work with the I/O interface 604, an I/O interface add-ons 616 may be created to interface with tenant system.

In various embodiments, each I/O interface add-on 616 may be configured to send and/or receive a message in a first format that is unintelligible to the translation engine 608 and re-format the message in a second format that is understandable to the translation engine 608. For example, a tenant system may communicate using a proprietary protocol or format. This protocol or format may not be understandable to the I/O engine 618 or the translation engine 608. In such an embodiment, an I/O interface add-on 616 may be configured to re-format the proprietary protocol to a format (e.g., XML, etc.) that can be understood by the I/O engine 618 or the translation engine 608.

In one embodiment, the translation engine 608 may be configured to convert a received external tenant message to an internal provider message, and vice versa, as described above. In various embodiments, the translation engine 608 may be configured to map data values received as part of the external tenant message to corresponding data values used by the internal service provider, as described above. In another embodiment, the translation engine 608 may be configured to perform data defaulting, as described above. For example, in one embodiment, the translation engine 608 may be configured to, if the external tenant message does not include data portion(s) required to form the internal provider message, create the internal provider message by substituting default data value(s) for the missing data portion(s), as described above. In various embodiments, the translation engine 308 may be configured to convert messages via a rule based conversion system, as described above.

In one embodiment, the data storage 612 may be configured to temporarily store the external tenant message and the internal provider message. In one embodiment, the data storage 612 may be configured to store a set of rules and data values for converting the external tenant message to the internal provider message. In various embodiments, the data storage 612 may include a database.

In one embodiment, the apparatus 600 may include a data management controller 610. In various embodiments, the data management controller 610 may be configured to manage the data storage 612. In such an embodiment, the data management controller 610 may be configured to logically partition or arrange the data storage 612 into a series of queues 613 (e.g., inbound queue(s), outbound queue(s), etc.) and random access storage (e.g., for the rules, default data, mapping data, etc.).

In such an embodiment, I/O interface 604 may be configured to transmit via publishing the internal provider message to an outbound message queue. In some embodiments, the outbound queue may be subscribed to by at least a portion of the internal service provider or an integration layer, as described above. In various embodiments, the outbound queue may include a portion of the data storage configured to act as the outbound message queue, as described above. In one embodiment, this inbound queue may be created or managed by the data management controller 610. It is understood that message receipt may include an inbound queue for the receipt of messages.

In one embodiment, the apparatus 600 may include an administrative UI engine 606 configured to facilitate the editing of a rule based system used by the translation engine 608 to convert messages, and data stored by the data storage. In various embodiments, the administrative UI engine 606 may create a UI via which the data and rule sets used by the translation engine 608 or other portions of the apparatus 600 (e.g., the data management controller 610). In various embodiments, this administrative UI engine 606 may be configured to allow only an internal user to edit or configure the apparatus 600 (e.g., by providing tenant identifiers, etc.). In another embodiment, this administrative UI engine 606 may be configured to also allow external tenant user to configure the apparatus 600 (e.g., by providing defaulting data, mapping data, rule sets, branding images and data, etc.).

In one embodiment, the apparatus 600 may include a tenant user UI engine 614 configured to facilitate the editing of tenant specific information (e.g., generate external tenant messages, etc.) by a tenant user. In various embodiments, the tenant user UI engine 614 may act as the tenant web UI 206 of FIG. 2, as described above. In one embodiment, the tenant user UI engine 614 configured to prevent a tenant user from accessing information regarding other tenant users.

In various embodiments, tenant user UI engine 614 may be configured to operate as a portion of the administrative UI engine 606 instead of or in addition to operating as the tenant web UI 206 of FIG. 2. In such an embodiment, the tenant user UI engine 614 may be configured to allow external tenant user to configure the apparatus 600 (e.g., by providing defaulting data, mapping data, rule sets, branding images and data, etc.).

FIG. 7 is a flow chart of an example embodiment of a technique 700 in accordance with the disclosed subject matter. In various embodiments, parts or all of the technique 700 may be the results of the operations of the various systems of FIG. 1, 2, 3, 4, or 5, or the apparatus 600 of FIG. 6. Although, it is understood that other apparatuses, systems and timing diagrams may produce technique 700.

Block 702 illustrates that, in one embodiment, the establishment of a relationship with a plurality of external tenant systems configured to utilize an internal service provider (e.g., an ERP service provider) or internal service provider system may occur, as described above. In various embodiments, establishing may include actions or steps taken by a multi-tenant engine. In some embodiments, steps or actions taken by a tenant or service provider may be outside the scope of the actions illustrated by Block 702; although, it is understood such tenant or service provider actions may be the cause or effects of establishment actions taken by a device (e.g., a multi-tenant engine) employing the described technique. In various embodiments, the action(s) described above may be performed by the multi-tenant engines of FIGS. 2 and 4, the controller 104 of FIG. 1, or the I/O interface 604 of FIG. 6, as described above.

In various embodiments, establishing may include, for each external tenant system, selecting one of a plurality of input/output (I/O) add-ons via which to communicate with the respective external tenant system, as described above. In one embodiment, each I/O add-on may be configured to define a communications channel for communication with an external tenant system, as described above. In various embodiments, the action(s) described above may be performed by the multi-tenant engines of FIGS. 2 and 4, the controller 104 of FIG. 1, or the I/O interface 604 of FIG. 6, as described above.

In some embodiments, establishing may include, for each external tenant system, creating mapping data including rule driven mapping relationships between the external tenant system and the internal service provider, as described above. In some embodiments, establishing may include, for each external tenant system, creating branding data configured to customize the user interface of the external tenant system, as described above. In some embodiments, establishing may include, for each external tenant system, creating authorization data configured to allow access to at least portions of the internal service provider by the external tenant system, as described above. In some embodiments, establishing may include, for each external tenant system, creating processing data configured to dictate how the internal service provider processes requests from the external tenant system, as described above. In various embodiments, the action(s) described above may be performed by the multi-tenant engines of FIGS. 2 and 4, the controller 104 of FIG. 1, or the UI engines 606 and/or 614 of the data storage 612 of FIG. 6, as described above.

Block 704 illustrates that, in one embodiment, an external tenant message may be received from one of the external tenant systems, as described above. In various embodiments, the action(s) described above may be performed by the multi-tenant engines of FIGS. 2 and 4, the transceiver 102 of FIG. 1, or the I/O interface 604 of FIG. 6, as described above.

Block 706 illustrates that, in one embodiment, the received external tenant message may be converted to an internal provider message, as described above. In various embodiments, converting may include reformatting the external tenant message to a format of an internal provider message, as described above. In another embodiment, converting may include using a mapping function to convert data values received as part of the external tenant message to corresponding data values used by the internal service provider, as described above. In some embodiments, converting may include replacing object identifiers (IDs) used by the external tenant systems with object IDs used by the internal service provider, as described above. In yet another embodiment, converting may include, if the external tenant message does not include data portion(s) required to form the internal message, creating the internal message by substituting default data value(s) for the missing data portion(s), as described above. In various embodiments, the action(s) described above may be performed by the multi-tenant engines of FIGS. 2 and 4, the controller 104 of FIG. 1, or the translation engine 608 of FIG. 6, as described above.

Block 708 illustrates that, in one embodiment, the converted internal provider message may be transmitted to at least a portion of the internal service provider system, as described above. In various embodiments, transmitting may include publishing the internal provider message to an inbound message queue that is configured to be subscribed to by at least a portion of the internal service provider system, as described above. In another embodiment, transmitting may include determining, based at least in part upon the external tenant message, which portion of the internal service provider system to transmit the internal message to, as described above. In various embodiments, the action(s) described above may be performed by the multi-tenant engines of FIGS. 2 and 4, the controller 104 of FIG. 1, or the I/O interface 604 of FIG. 6, as described above.

Block 710 illustrates that, in one embodiment, an internally generated message (e.g., an internal response message) may be received from a portion of the internal ERP service provider system, as described above. In various embodiments, the action(s) described above may be performed by the multi-tenant engines of FIGS. 2 and 4, the transceiver 102 of FIG. 1, or the I/O interface 604 of FIG. 6, as described above.

Block 712 illustrates that, in one embodiment, the internal response message may be converted to an external response message, as described above. In various embodiments, the action(s) described above may be performed by the multi-tenant engines of FIGS. 2 and 4, the controller 104 of FIG. 1, or the translation engine 608 of FIG. 6, as described above.

Block 714 illustrates that, in one embodiment, the external response message may be transmitted to at least one of the external tenant systems, as described above. In various embodiments, the action(s) described above may be performed by the multi-tenant engines of FIGS. 2 and 4, the transceiver 102 of FIG. 1, or the I/O interface 604 of FIG. 6, as described above.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A method comprising:
    providing a virtual instance of an internal service provider system to each of two or more external tenant systems associated with the internal service provider system, where
        each of the virtual instances are virtually partitioned for each respective external tenant system, each virtual partition including an inbound queue, an outbound queue and configuration data storage configured to store translation information associated with the corresponding external tenant system,
        internal indicates any system or application that is under the control of the service provider system, and external indicates any system or application that is not under the control of the service provider system;
    receiving an external tenant message in a tenant format associated with an external tenant system from the external tenant system, the external tenant message including a request for an operation to be performed by the internal service provider system;
    converting the received external tenant message having the tenant format to an internal provider message having a service-provider format, the converting of the external tenant message being based on the translation information, the converting of the external tenant message including:
        converting the format of the external tenant message from a protocol associated with communicating the external message to a format associated with communicating the internal provider message, and
        determining whether data expected to be included in the external tenant message when received from the external tenant system was included in the external tenant message when received from the external tenant system, the data comprising information identifying a specific account for a relationship between a tenant of the external tenant system and the internal service provider system, wherein (i) when the data has been included in the external tenant message, the converting of the external tenant message further comprises providing the data in the converted internal provider message, and wherein (ii) when the data has not been included in the external tenant message, the converting of the external tenant message further comprises replacing data values received as part of the external tenant message in the converted internal provider message with data values corresponding to data values used by the internal service provider system using a mapping function, including including a default data value in the converted internal provider message, the default data selected based upon the external tenant system;
    transmitting the converted internal provider message to the internal service provider system via a corresponding inbound queue;
    receiving an internal provider response from the internal service provider system that performed the operation in response to the converted internal provider message, the internal provider response including operation results having the service-provider format associated with the internal service provider system that performed the operation;
    converting the internal provider response having the service-provider format to an external tenant response having the external tenant format, the converting of the internal provider response including:
        converting the format of the internal provider response from a protocol associated with communicating the internal provider response to a format associated with communicating the external tenant response, and
        replacing data values of the operation results received as part of the internal provider response in the converted external tenant response with data values corresponding to data values used by the external tenant system using the mapping function; and
    transmitting the external tenant response to the external tenant system via a corresponding outbound queue.

2. The method of claim 1 wherein the converting the received external tenant message having the tenant format to an internal provider message having a service-provider format includes:
    replacing object identifiers (IDs) used by the external tenant system with object IDs used by the internal service provider system.

3. The method of claim 1 wherein the transmitting the converted internal provider message to the internal service provider system includes:
    publishing the internal provider message to an outbound message queue that is configured to be subscribed to by a plurality of service provider systems including the internal service provider system.

4. The method of claim 1 wherein the providing includes, for each external tenant system:
selecting one of a plurality of input/output (I/O) add-ons via which to communicate with the respective external tenant system; and
wherein each I/O add-on is configured to define a communications channel for communication with the respective external tenant system.

5. The method of claim 1 wherein the providing includes, for each external tenant system:
creating mapping data including rule driven mapping relationships between the external tenant system and the internal service provider system;
creating branding data configured to customize the user interface of the external tenant system;
creating authorization data configured to allow access to the internal service provider by the external tenant system; and
creating processing data configured to dictate how the internal service provider system processes requests from the external tenant system.

6. An apparatus comprising:
a input/output (I/O) interface configured to receive an external tenant message in a tenant format associated with an external tenant system among a plurality of external tenant systems from the external tenant system, wherein
each external tenant system of the plurality of external tenant systems is provided with a respective virtual instance of an internal service,
internal indicates any system or application that is under the control of the service provider system, and
external indicates any system or application that is not under the control of the service provider system;
a translation engine configured to convert the received external tenant message having the tenant format to an internal provider message having a service-provider format, the converting of the external tenant message being based on the translation information, the converting of the external tenant message including:
converting the format of the internal provider response from a protocol associated with communicating the internal provider response to a format associated with communicating the external tenant response, and
determining whether data expected to be included in the external tenant message when received from the external tenant system was included in the external tenant message when received from the external tenant system, data comprising information identifying a specific account for a relationship between a tenant of the external tenant system and the internal service provider system, wherein (i) when the data has been included in the external tenant message, the converting of the external tenant message further comprises providing the data in the converted internal provider message, and wherein (ii) when the data has not been included in the external tenant message, the converting of the external tenant message further comprises replacing data values received as part of the external tenant message in the converted internal provider message with data values corresponding to data values used by the internal service provider system using a mapping function, including including a default data value in the converted internal provider message, the default data selected based upon the external tenant system; and
a data storage including a virtual partition for each virtual instance of an internal service, each virtual partition including an inbound queue, an outbound queue and configuration data storage configured to temporarily store the external tenant message in a corresponding outbound queue and the internal provider message in a corresponding inbound queue, and the configuration data storage is configured to store the mapping function including a set of rules and data values for converting the external tenant message to the internal provider message,
the I/O interface configured to transmit the converted internal provider message to the service provider system,
the I/O interface configured to receive an internal provider response from the service provider system that performed the operation in response to the converted internal provider message, the internal provider response including operation results having the service-provider format associated with the service provider system that performed the operation,
the translation engine configured to convert the internal provider response having the service-provider format to an external tenant response having the external tenant format, the converting of the internal provider response including:
converting the format of the internal provider response from a protocol associated with communicating the internal provider response to a format associated with communicating the external tenant response, and
replacing data values of the operation results received as part of the internal provider response in the converted external tenant response with data values corresponding to data values used by the external tenant system using the mapping function,
the I/O interface configured to transmit the external tenant response to the external tenant system.

7. The apparatus of claim 6 wherein the I/O interface configured to transmit the converted internal provider message to the service provider system including publishing the internal provider message to an outbound message queue that is configured to be subscribed to by a plurality of internal service providers including the internal service provider;
and wherein a portion of the data storage is configured to provide the outbound message queue.

8. The apparatus of claim 6 further comprising:
a data management controller configured to organize portions of the data store into a combination of inbound queues, outbound queues, random access data storage.

9. The apparatus of claim 6 further comprising:
an administrative user interface (UI) engine configured to facilitate the editing of a rule based system used by the translation engine to convert messages, and facilitate the editing of data stored by the data storage.

10. The apparatus of claim 6 further comprising:
a tenant user interface engine configured to facilitate the editing of tenant specific information by a tenant user, and prevent a tenant user from accessing information regarding other tenant users.

11. The apparatus of claim 6 wherein the I/O interface includes:
a plurality of I/O interface add-ons, wherein each I/O interface add-on is configured to either send, receive or both send and receive a message in a first format that is unintelligible to the translation engine and re-format the message in a second format that is understandable to the translation engine; and wherein the I/O interface is configured to dynamically incorporate an I/O interface add-on into the I/O interface.

12. A non-transitory machine-readable medium comprising instructions capable of being executed by at least one machine, wherein the instructions, when executed, cause the machine to:

provide a virtual instance of an internal service provider system to each of one or more external tenant systems associated with the internal service provider system, where each of the virtual instances are virtually partitioned for each respective external tenant system, each virtual partition including an inbound queue, an outbound queue and configuration data storage configured to store translation information associated with the corresponding external tenant system, internal indicates any system or application that is under the control of the service provider system, and external indicates any system or application that is not under the control of the service provider system;

receive an external tenant message in a tenant format associated with an external tenant system from the external tenant system, the external tenant message including a request for an operation to be performed by the internal service provider system;

convert the received external tenant message having the tenant format to an internal provider message having a service-provider format, the converting of the external tenant message being based on the translation information, the converting of the external tenant message including:

converting the format of the internal provider response from a protocol associated with communicating the internal provider response to a format associated with communicating the external tenant response, and determining whether data expected to be included in the external tenant message when received from the external tenant system was included in the external tenant message when received from the external tenant system, the data comprising information identifying a specific account for a relationship between a tenant of the external tenant system and the internal service provider system, wherein (i) when the data has been included in the external tenant message, the converting of the external tenant message further comprises providing the data in the converted internal provider message, and wherein (ii) when the data has not been included in the external tenant message, the converting of the external tenant message further comprises replacing data values received as part of the external tenant message in the converted internal provider message with data values corresponding to data values used by the internal service provider system using a mapping function, including including a default data value in the converted internal provider message, the default data selected based upon the external tenant system;

transmit the converted internal provider message to the internal service provider system via a corresponding inbound queue;

receive an internal provider response from the internal service provider system that performed the operation in response to the converted internal provider message, the internal provider response including operation results having the service-provider format associated with the internal service provider system that performed the operation;

convert the internal provider response having the service-provider format to an external tenant response having the external tenant format, the converting of the external tenant message being based on the translation information, the converting of the internal provider response including:

converting the format of the internal provider response from a protocol associated with communicating the internal provider response to a format associated with communicating the external tenant response, and replacing data values of the operation results received as part of the internal provider response in the converted external tenant response with data values corresponding to data values used by the external tenant system using the mapping function; and transmit the external tenant response to the external tenant system via a corresponding outbound queue.

13. The method of claim 1, further comprising:

each inbound queue is configured to receive external tenant messages from a corresponding external tenant system and publish the queued external tenant messages for the internal service provider system to select the external tenant messages; and each outbound queue is configured to receive internal tenant messages from the internal service provider system and publish the queued internal tenant messages for the corresponding external tenant system to select the external tenant response, wherein the external tenant message is received via the inbound queue, and the external tenant response is transmitted via the outbound queue.

14. The method of claim 1, further comprising:

each inbound queue is configured to receive external tenant messages from a corresponding external tenant system and provide a subscription service for the internal service provider system to select the external tenant messages; and each outbound queue is configured to receive internal tenant messages from the internal service provider system and publish the queued internal tenant messages for the corresponding external tenant system to select the external tenant response, wherein the external tenant message is received via the inbound queue, and the external tenant response is transmitted via the outbound queue.

15. The method of claim 1, wherein the default data value provides the data that was not provided by the external tenant message.

16. The method of claim 1, further comprising providing the default value also in another situation.

17. The method of claim 16, wherein the other situation includes that a particular data is a norm and defaulting reduces transmission or message size.

18. The method of claim 1, wherein providing the default data value comprises applying a rule to the external tenant message.

19. The method of claim 1, wherein providing the default data value comprises using a set of master defaulting data for a particular tenant of the external tenant system.

20. The method of claim 19, further comprising loading the set of master defaulting data and associating the set of master defaulting data with the external tenant system.

21. The method of claim 20, wherein the loading and the association are performed before transmission of the external tenant message.

* * * * *